Nov. 30, 1937.　　　J. F. DONOVAN ET AL　　　2,100,656
TUBULATING MACHINE
Filed Sept. 6, 1935　　　2 Sheets-Sheet 1

Inventors:
John F. Donovan,
Frank J. Malloy,
by Harry E. Dunham
Their Attorney.

Nov. 30, 1937.    J. F. DONOVAN ET AL    2,100,656

TUBULATING MACHINE

Filed Sept. 6, 1935    2 Sheets-Sheet 2

Inventors:
John F. Donovan,
Frank J. Malloy,
by Harry E. Dunham
Their Attorney.

Patented Nov. 30, 1937

2,100,656

UNITED STATES PATENT OFFICE 2,100,656

TUBULATING MACHINE

John F. Donovan, East Cleveland, and Frank J. Malloy, Cleveland Heights, Ohio, assignors to General Electric Company, a corporation of New York Application September 6, 1935, Serial No. 39,434

7 Claims. (Cl. 49—2)

Our invention relates to machines for use in the manufacture of incandescent lamps and similar articles and more particularly to tubulating machines for uniting an exhaust tube to a portion of an incandescent lamp or similar article through which the bulb or envelope of said lamp or similar article is to be exhausted.

According to our invention, we provide an intermittently moving, preferably rotating, turret on which is mounted a number of heads adapted to receive the lamp parts to be operated upon. The movable parts of the heads are operated by a plurality of stationary cams, and burners on said heads are controlled by valves operated by stationary cams and by a rotary valve. The operation of tubulating is continuous and automatic, it being necessary only for the operator to place the parts to be operated upon in the heads. The exhaust tube is correctly gauged in a portion of the head so that its lower end is a definite distance from the part to which it is to be sealed. The tube and the part to which it is to be sealed are then caused to progressively pass a number of means which are caused to act upon them and seal them together after which a portion of the tube is constricted so as to facilitate sealing it off after exhaustion of the bulb or envelope of the lamp or similar article.

Further features and advantages of our invention will appear from the following detailed description of species thereof and from the drawings.

Figure 1:
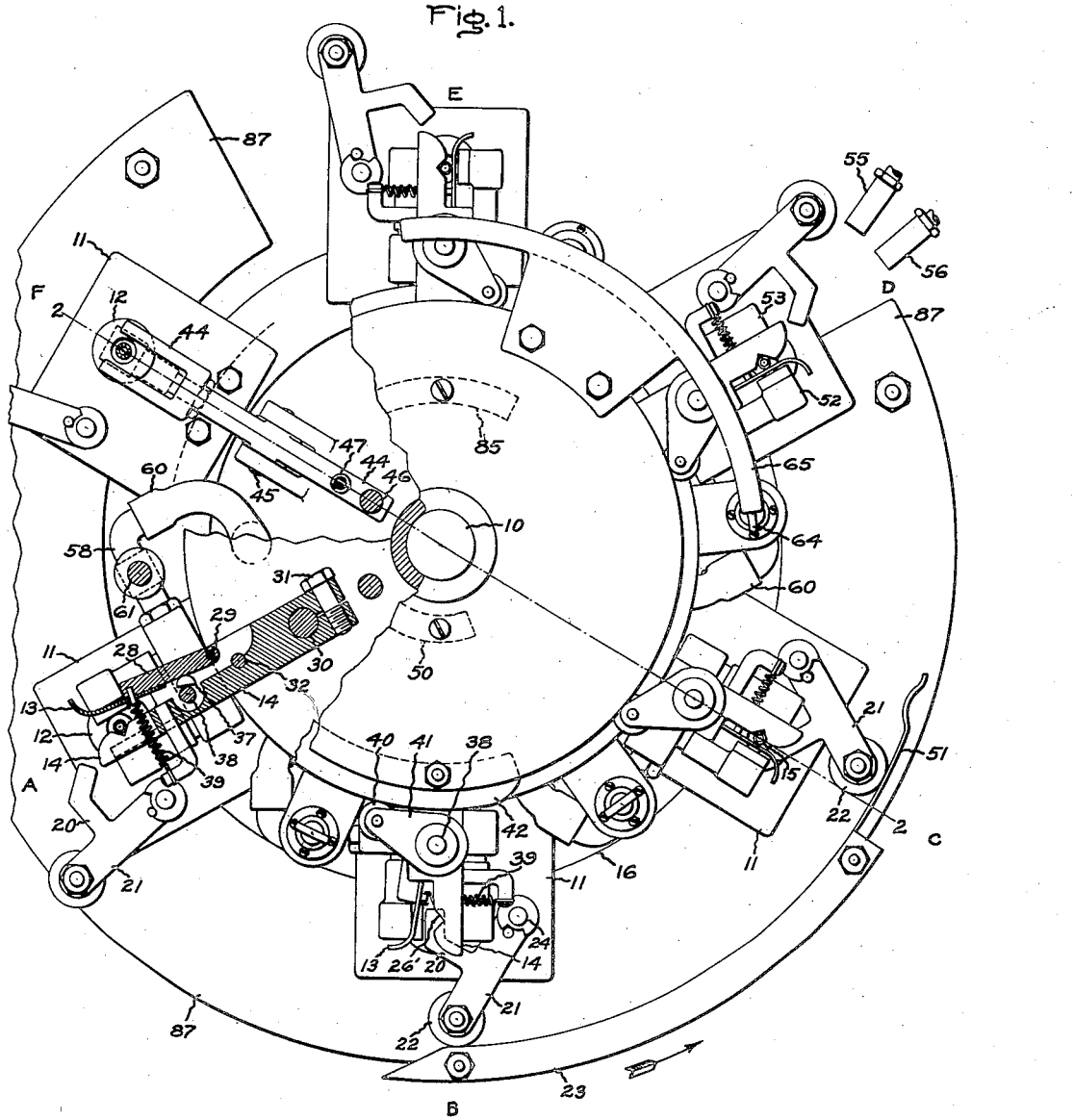
Figure 2:
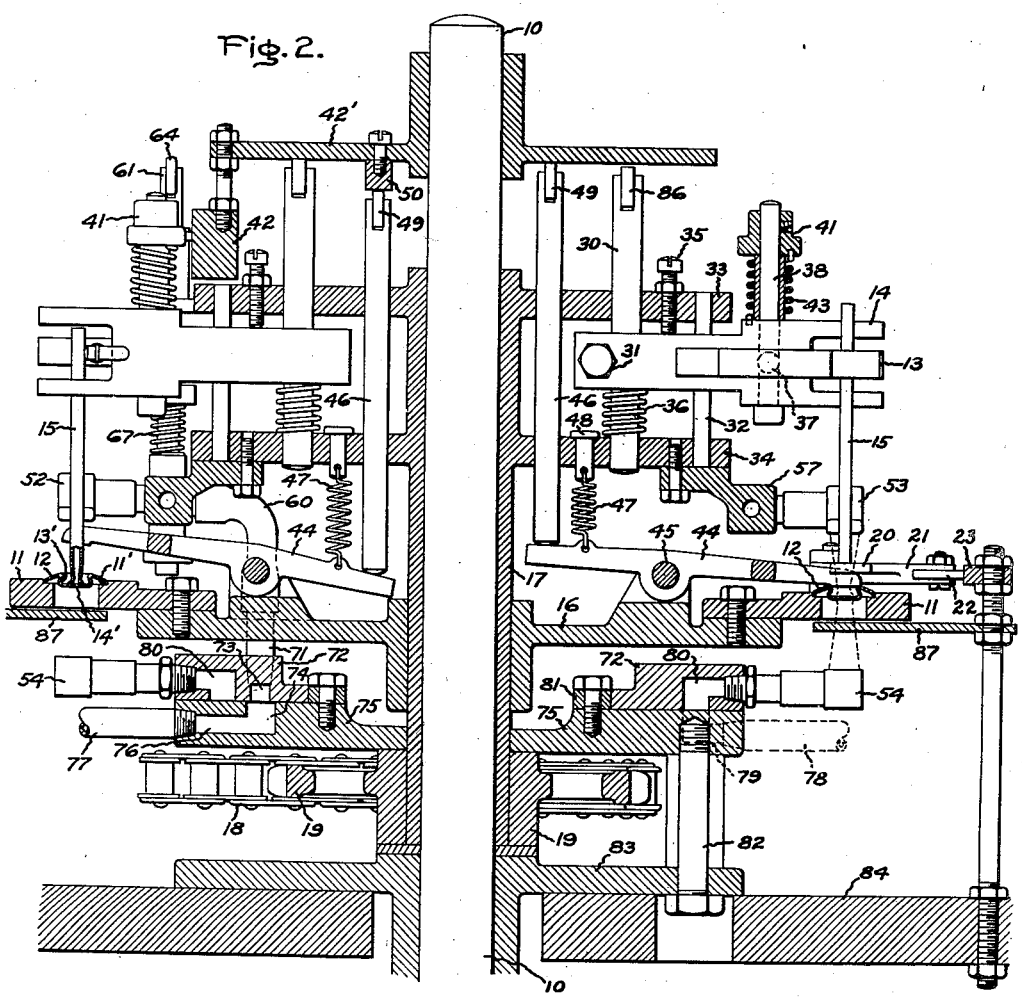
Figure 4:
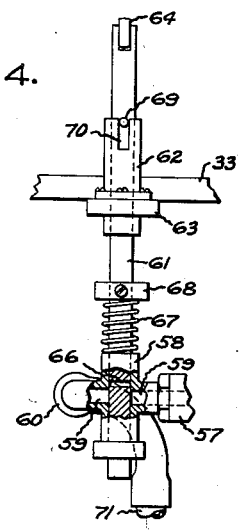
Figure 3:
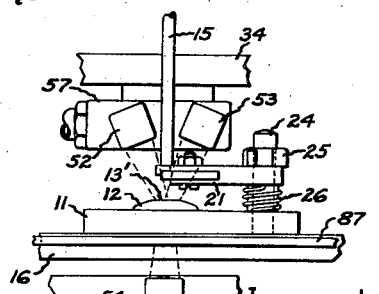

In the drawings Fig. 1 is a plan view, partially broken away, of a machine comprising our invention; Fig. 2 is a section through Fig. 1 along line 2—2; and Figs. 3 and 4 are side elevations of details of the machine.

The machine shown in the drawings comprises six heads which are moved in a counter-clockwise direction about the spindle 10. Each head comprises a plate 11 having a recessed portion or pocket 11' in which the metal disc 12 is placed and a pair of jaws 13 and 14 which hold the glass tube 15. The particular disc 12 shown is of the type covered in U. S. patent application Serial No. 3,334, Harold D. Blake, filed January 24, 1935, and has a recess or indentation 13' with an exhaust aperture 14' therein. The plates 11 are attached to the turret 16 which is mounted on the sleeve 17. A disc 12 is inserted in the recess 11' in each plate 11 as it passes between positions F and B. The turret 16 is rotated through the sleeve 17 by a chain 18 which drives a sprocket 19 mounted on said sleeve 17. When the head moves into position B the arm 20 of a gauging lever 21 is moved into position above the disc 12 by engagement of roller 22 on arm 21 with the cam 23. As shown in Fig. 3, lever 21 is pivotally mounted on a stud 24 extending from plate 11 and is pressed against a collar 25 by a torsion spring 26 which also tends to rotate said lever in a counter-clockwise direction.

The glass tube 15 is placed between the jaws 13 and 14, being centered in a V-shaped slot 26' in jaw 14, as the head passes through position B and is rested against the arm 20 of lever 21 which gauges it vertically. The movable jaw 13 is fastened to arm 28 (see position A, Fig. 1) which is located in a slot in the stationary jaw 14 and which is pivoted on pin 29 extending through said jaw. The stationary jaw 14 is clamped to rod 30 by bolt 31 and slidably engages rod 32. Rod 30 is slidably mounted in the flanges 33 and 34 extending from sleeve 17, and rod 32 is fastened to said flanges and keeps the jaw from swinging out of position. The vertical position of the jaws is fixed by the stop screw 35 in the upper flange 33 of the turret against which the stationary jaw 14 is pushed by the spring 36 located between it and the lower flange 34 of the turret. The movable jaw 13 is pushed away from the stationary jaw 14, so the glass tubing may be inserted therebetween, by a protuberance consisting of the head of a pin 37 (Fig. 1) extending from a pin or shaft 38 against which the jaw is drawn by spring 39 which extends between posts in the jaws. The shaft 38 is held in this position by the engagement of roller 40 (see position B) on an arm 41 on the end of said shaft, with cam 42 which is attached to a stationary flange 42'. A torsion spring 43 (Fig. 2) holds the arm 41 against the cam 42.

Substantially midway between positions B and C the jaws 13 and 14 are closed and the disc 12 is engaged by the hold-down lever 44 (Fig. 2). The jaws are closed on the glass tube 15 when the roller 40 on arm 41 passes the end of cam 42. The hold-down lever 44 pivots on pin 45 which is mounted in lugs on the turret 16 and is moved by a vertical rod 46 and a spring 47 which is attached to a pin 48. At the same time that jaws 13, 14 are closed, a roller 49 on the upper end of rod 46 leaves a cam 50 on flange 42', thereby allowing the spring 47 to pull the inner end of lever 44 upward and the outer end downward to engage the disc 12. At position C the roller 22 passes onto the spring 51 extending from cam 23, and the lever 21 is gradually moved outward until it finally swings free as the roller 22 leaves the spring.

At position D the upper fires from burners 52 and 53 and the lower fire from burner 54 are lighted by the stationary burners 55 and 56. The location of the burners can best be seen in Figs. 2 and 3 in which burners 52 and 53 are directed into the indentation 13' of the disc 12, and the burner 54 is directed at the bottom of the indentation. Burners 52 and 53 are mounted on a short manifold 57 which is attached to flange 34 and is fed a gas and air mixture through the valve 58 shown in Fig. 4. The valve comprises a body portion 58 having a through passage 59 leading from the manifold 57 to a hose 60. A valve pin 61 is slidably mounted in the body portion 58 across the passage 59 and in a bearing 62 which is supported by arm 63 extending from flange 33. The said pin 61 is moved down when a roller 64 on its upper end engages a cam 65 which is mounted on the flange 42'. The downward movement of pin 61 causes a passage 66 therethrough to be aligned with the ends of passage 59, thereby allowing gas to flow to the burners 53. The spring 67, located between the valve body 58 and a collar 68 on rod 61, is contracted by this movement and pin 69, which is carried by the rod 61, is moved down in a slot 70 in the bearing 62. The pin 69 prevents the rod 61 from turning and thus assures the proper alignment of passage 66 with passage 59. The hose 60 is attached to a nipple 71 (Fig. 2) which is mounted on the top half 72 of a rotary valve and communicates with a passage 73 therein. The passage 73 is in line with a passage 74 in the lower half 75 of the rotary valve when the fires are burning, the gas being fed to passage 74 through passage 76 from a pipe 77. The lower burner 54 is mounted on the upper half 72 of the rotary valve and receives gas from a pipe 78 through passages 79 and 80. A ring 81 fastened to the lower half 75 of the rotary valve keeps the upper half 72 of the valve in position and a stud (not shown) connecting the upper half of the valve and turret 16 causes the said upper half of the valve to rotate. The lower half 75 of the valve is supported by studs 82 extending from a flanged bearing 83 which supports the center spindle 10 and is fastened to the table 84. When position D is reached, passages 79 and 80 are aligned, thereby permitting gas to flow to the burner. Passage 79 does not extend around the valve but only where the lower burners 54 are operated.

When the center of the disc is heated, the end of the glass tube 15 is carried down into engagement therewith around the edge of the aperture 14' therein. The downward movement of the tube 15 begins midway between positions D and E at which time a cam 85 (Fig. 1) on flange 42' is engaged by a roller 86 (Fig. 2) on the end of rod 30 and the jaws 13 and 14 are moved down. As the tube 15 moves down, the end thereof is carried into the fires and heated so that it is sealed to the disc 12 when brought into engagement therewith. The tube 15 is preferably pulled upward a short distance again so that it is stretched and a contraction is formed as shown. Midway between positions E and F the fires are extinguished. The gas mixture to lower burner 54 is cut off by the rotary valve 72, 75 and the mixture to upper burners 52, 53 is cut off by the valve 58 as the roller 64 on the end of valve pin 61 leaves the end of the cam 65 and said pin moves upward. At position E the roller 49 on rod 46 engages the front end of cam 50, thereby pushing down the inner end of lever 44 and lifting the outer end thereof off the disc 12. At the same time, the roller 40 on arm 41 engages the cam 42 and is swung counter-clockwise, thereby rotating the pin 38 secured thereto and causing the jaws 13, 14 to open. The disc 12 with the tube 15 sealed thereto is then removed from the machine. A plate 87 is disposed above burners 54 and extends from a point between positions E and F to position D. The said plate serves to protect the operator from the hot burners and forms an adjustable means for cutting off the flames from burners 54.

What we claim as new and desire to secure by Letters Patent of the United States is:

1. In a tubulating machine, the combination of a movable carrier, a plurality of heads thereon each comprising a tube holder having tube gripping members and a holder for the lamp part to which said tube is to be sealed and a gauge arm located between said holders for spacing the end of said tube from said lamp part, means for clamping said lamp part in its holder, burners on said heads for heating said lamp parts and said tubes, means for moving said carrier and causing said gauge arm to move away from its position between said holders, and cam means for successively moving said tube holders as said carrier is moved to bring the ends of the tubes therein against the said lamp parts to seal them thereto.

2. In a tubulating machine, the combination of a turret, a plurality of heads thereon each comprising a tube holder having tube gripping members and a holder for the lamp part to which said tube is to be sealed disposed below said tube holder and a pivotally mounted gauge arm located between said holders for spacing the end of said tube from said lamp part, a spring actuated pivotally mounted arm for clamping said lamp part in its holder, means for heating said lamp parts and tubes, means for indexing said turret and causing said gauge arm to pivot away from its position between said holders, stationary cam means for successively moving said tube holders downward as said turret is indexed to bring the ends of the tubes therein against the said lamp parts to seal them thereto, and stationary cam means for subsequently opening said tube gripping members and lifting said arm from said lamp part.

3. In a tubulating machine, the combination of a turret, a plurality of heads thereon each comprising a tube holder and a holder for a disc to which said tube is to be sealed disposed below said tube holder, means for clamping said disc in its holder, burners on said heads for heating the discs and tubes, valves comprising pins for controlling the flow of gas to said burners, burners disposed below said disc holders, a rotary valve for controlling the flow of gas to said second-mentioned burners, means for indexing said turret, cam means for successively moving said tube holders downward as said turret is rotated to bring the ends of the tubes therein against the said discs to seal them thereto, and stationary cam means disposed adjacent the path of travel of ends of the valve pins of said first-mentioned burners for subsequently closing said valves, the gas flow to said second-mentioned burners being cut off substantially at the same time by the said rotary valve.

4. In a tubulating machine, the combination of a turret, a plurality of heads thereon each comprising a tube holder having tube gripping members and a vertically disposed rod secured thereto and a holder for the lamp part to which said tube is to be sealed disposed below said tube holder, spring actuated pivotally mounted and radially disposed arms the outer ends of which are adapted to clamp said lamp parts in their holders, vertically disposed rods engaging the inner ends of said arms, burners on each of said heads for heating said tubes and lamp parts, valves comprising vertically disposed pins for controlling the flow of gas to said burners, means for indexing said turret, a stationary flange disposed above said heads, a cam on said flange for engaging the upper ends of the rods secured to the tube holders and moving said holders downward as said turret is indexed to bring the ends of the tubes therein against the said lamp parts to seal them thereto, another cam on said flange for subsequently engaging and moving said valve pins downward to cut off the flow of gas to said burners, and other cams on said flange for moving downward the rods engaging the said radially disposed clamping arms to release the said lamp parts and for opening the tube gripping members.

5. In a tubulating machine, the combination of a turret mounted on a vertical axis, means for indexing said turret, a plurality of holders for discs located at the periphery of said turret, a plurality of radially disposed arms pivotally mounted on said turret and adapted to engage said discs at their outer ends to clamp said discs in their holders, a plurality of vertically disposed rods slidably mounted in said turret and engaging the inner ends of said arms, another set of vertically disposed rods slidably mounted in said turret, holders for glass tubes mounted on said second-mentioned set of rods and adapted to hold said glass tubes in a vertical position above said discs, burners for heating said discs and glass tubes, a stationary horizontally disposed flange located above said turret adjacent to the upper ends of said two sets of rods, a cam track on said flange adapted to be engaged by the upper ends of said second-mentioned set of rods to lower the holders thereon and cause the ends of the glass tubes in said holders to engage the discs and be sealed thereto, and another cam track on said flange adapted to be engaged by the upper ends of said first-mentioned set of rods to move said rods downwardly and thereby cause the arms engaged thereby to be pivoted so as to release the said discs.

6. In a tubulating machine, the combination of a turret mounted on a vertical axis, means for indexing said turret, a plurality of holders for discs located at the periphery of said turret, a plurality of radially disposed arms pivotally mounted on said turret and adapted to engage said discs at their outer ends to clamp said discs in their holders, a plurality of vertically disposed rods slidably mounted in said turret and engaging the inner ends of said arms, another set of vertically disposed rods slidably mounted in said turret, holders for glass tubes mounted on said second-mentioned set of rods and adapted to hold said glass tubes in a vertical position above said discs, said holders each comprising a stationary jaw and a movable jaw, a vertically disposed pin rotatably mounted in said stationary jaw and having a protuberance thereon adapted to engage said movable jaw, burners for heating said discs and glass tubes, a stationary horizontally disposed flange located above said turret adjacent to the upper ends of said two sets of rods, a cam track on said flange adapted to be engaged by the upper ends of said second-mentioned set of rods to lower the holders thereon and cause the ends of the glass tubes in said holders to engage the discs and be sealed thereto, another cam track on said flange adapted to be engaged by the upper ends of said first-mentioned set of rods to move said rods downwardly and thereby cause the arms engaged thereby to be pivoted so as to release the said discs, and another cam track on said flange for causing the said pins in said stationary jaws to be rotated and thereby cause the protuberances on said pins to engage said movable jaws and move them away from said stationary jaws to release the glass tubes held thereby.

7. In a tubulating machine, the combination of a horizontal turret having a plurality of pockets for receiving discs at the periphery thereof, tube holders located above said pockets for holding a glass tube in a vertical position above the disc in each of said pockets, a burner located below each of said pockets for directing a flame upon the bottom surface of the disc therein through an opening in the turret and means for moving said tubes downward to seal the ends thereof to the upper surfaces of said discs.

JOHN F. DONOVAN.
FRANK J. MALLOY.